United States Patent Office 2,745,730
Patented May 15, 1956

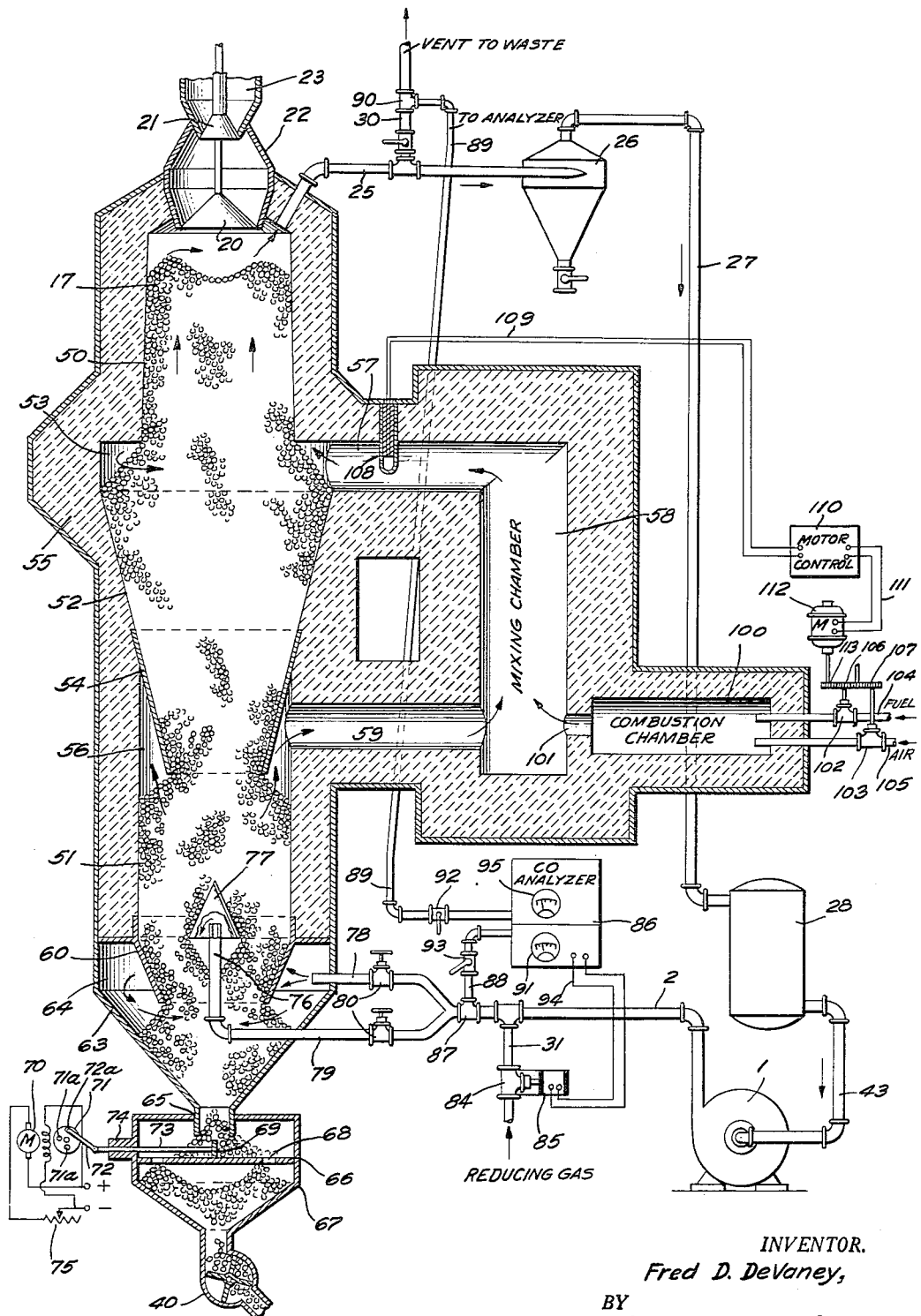

2,745,730

PROCESS OF REDUCING MANGANESE ORES

Fred D. De Vaney, Hibbing, Minn., assignor to Pickands Mather & Co., Cleveland, Ohio, a copartnership Application January 29, 1952, Serial No. 268,729

1 Claim. (Cl. 75—1)

This invention relates broadly to the art of reducing to manganous oxide the manganese content of a manganese-bearing ore or ore material, and has special application as a step in the process of recovering manganese, in the form of useful compounds of manganese, from ores and ore materials containing manganese oxide by a leaching procedure. The invention is particularly concerned with improvements in the step of preparing manganese oxide-bearing iron ores or ore materials for the leaching operation by converting the manganese content thereof to manganous oxide (MnO) and the iron content to magnetite ($Fe_3O_4$).

Much of the large reserve of manganese in the United States is in the form of manganiferous iron ores. Typical of such reserves are the ores found in the Cuyuna Range of Minnesota, which Cuyuna ores have a manganese content of the order of 8–10%, an iron content of the order of 35% and a silica content of the order of 25%. Another large reserve is in the Chamberlain, South Dakota area where large deposits of lean material occur the nodules from which deposits customarily contain approximately 16% manganese and about 12%, more or less, of iron. Other large low grade deposits are at Artillery Peak, Arizona, and The Three Kids Mine in Nevada.

For recovering manganese from the Cuyuna and similar ores it has been proposed to leach the material with an ammoniacal solution. It is necessary, for the successful carrying out of the leaching process, that the manganese content of the starting material be in the manganous form and that the iron content be in the from of magnetite ($Fe_3O_4$). Since in such ores and ore materials the manganese customarily occurs in the manganic form and the iron in the ferric form, it follows that preliminary to the actual leaching the starting material must first be subjected to reduction so as to convert the manganese to MnO and the iron to $Fe_3O_4$. Manganese in nature occurs in a wide variety of minerals. Some of the more common oxide varieties of manganese are: Pyrolusite ($MnO_2$); wad (mixture of oxides); manganite ($Mn_2O_3 \cdot H_2O$); psilomelane ($H_4R_2Mn_8O_{20}$); hausmannite ($Mn_3O_4$).

All of the above mineral must be given a reducing roast to convert them to the leachable manganous form. However, for brevity, in the following description the terminology "manganese dioxide" is used to describe all of the above minerals since they must all be reduced to render them susceptible to leaching.

According to the present invention, the manganese and iron contents of such ferruginous manganese oxide-bearing ores and ore materials can be reduced to the MnO and $Fe_3O_4$ states, respectively, in an economical manner by a reductive roasting procedure according to which a gravitationally descending column of the starting material in particulate or "fluent" form is established in a shaft-type furnace and maintained by adding fresh particulate material to the stockline of the column and withdrawing like amounts of reacted and cooled particles from the bottom thereof, and through the upper part of the column there is passed upwardly a current of a reactive gas mixture devoid of free oxygen and initially containing carbon dioxide and a gaseous reducing agent of the group consisting of carbon monoxide and hydrogen. The gas mixture is initially at an elevated temperature, below the fusing temperature of the particulate starting material, and has such a volume that the heat capacity of the gas mixture is at least as great as is the heat capacity of the starting material; the content of the gaseous reducing agent component of the mixture is initially at least sufficient to reduce all of the manganese and iron of the starting material to manganese oxide and magnetite, respectively, and the carbon dioxide and gaseous reducing agent are present in such relative proportion that the gas mixture at the temperature of operation is reducing with respect to manganese dioxide and ferric oxide, is oxidizing with respect to manganese and ferrous oxide and is in equilibrium with manganous oxide and magnetite. During its countercurrent passage through the upper part of the column the gas mixture dehydrates the starting material, heats the same to reactive temperature, reduces substantially all of the $MnO_2$ and $Fe_2O_3$ to MnO and $Fe_3O_4$ and exits from the column as a water vapor-laden exhaust gas containing a substantially lower concentration of gaseous reducing agent and a higher concentration of carbon dioxide than originally. Theoretically 4.25 cubic feet of CO (or an equivalent amount of hydrogen) is required to reduce 1 pound of $MnO_2$ to MnO. A fractional part of this exhaust gas is wasted to atmosphere, and the residual part is substantially dried and cooled and thereupon re-formed into reactive gas mixture in the original volume, composition and ratio of $CO_2$ to gaseous reducing agent by adding to the cooled residual part a suitable amount of a gas rich in said gaseous reducing agent (CO and/or $H_2$). The so re-formed, cool or relatively cool, reactive gas mixture is passed countercurrently through the lower part of the column of particulate ore during which passage the contacted ore is cooled by heat transfer to the gas mixture. After passing through the lower part of the column the reactive gas mixture largely is withdrawn from the column, is heated in a mixing space to the aforesaid elevated temperature without substantial change in chemical composition and thereupon is used as heated reactive gas mixture in a repetition of the described cycle.

It has been found that in the carrying out of the above described cyclical procedure it does not necessarily follow that substantially all of the manganese content of the reduced product can be extracted by ammoniacal leaching solution in an ensuing leaching step. On occasion, substantially all of the manganese can be leached out, and on other occasions the proper practice of the leaching step fails to extract a considerable proportion of the manganese known to be present therein. Investigation has shown that in both occasions substantially all of the manganese content of the reduced product is in the form of manganous oxide, but that sometimes this latter is substantially all leachable, while at other times not.

It has now been discovered that in the poorly leachable reduced product the manganous oxide is in part present therein in a "dead-burned" form, and that when such "dead-burning" occurs the same is attributable to overheating of the starting material in the upper part of the column. Accordingly, it is a feature of the present invention so to effect the reductive roasting process that the starting material is not subjected to undue heating whereby to avoid formation of "dead-burned" manganous oxide and to insure that the manganous oxide content of the reduced material is in a readily leachable state.

In connection with this discovery it was found that when manganese-bearing ore or ore material is brought to reactive temperature in the presence of a gas having a reducing effect, the reduction of $MnO_2$ to $MnO$ is sufficiently exothermic to cause a substantial rise in temperature of the material in the zone thereof undergoing active reduction above the entrant temperature of the heated reactive gas mixture, which temperature rise may amount to 200–500° F. or more. This augmented heating results in a so-called "peak temperature" believed to be the cause, when uncontrolled, of the undesirable "dead burning."

It has been found that such disadvantageous "deadburning" of the formed MnO can be wholly or at least substantially prevented by maintaining the initial temperature of the reactive gas mixture—that is to say, the temperature of the reactive gas mixture as the same is re-introduced into the column after having been heated in a spacially separate zone—at not in excess of 1200° F., and preferably at a temperature lower than 1200° F. It has been found that the desirable temperature is within the range 800°–1200° F. As the temperature of the reactive gas mixture is decreased the reaction time—i. e., the time required to effect substantially complete reduction—is somewhat increased; in the event a significant increase in reaction time is indicated, the same can be compensated for by appropriate extension of the period during which the starting material and the heated reactive gas mixture are held in contact.

By following this procedure it eventuates that the re-introduced heated reactive gas mixture acts—although the same is at an elevated temperature—as a tempering means for the ore undergoing active reduction, thereby preventing dead-burning of the latter.

The invention will now be described in greater detail with reference to the following illustrative example and in connection with the appended drawing, in which the single figure is a diagrammatic representation of one operable form of apparatus for use in carrying out the process of the invention.

In the drawing there is represented a generally vertical furnace which includes an upper chamber 50, a lower chamber 51, and a chamber 52 intermediate the upper and lower chamber all being in vertical alignment and preferably cylindrical in transverse section. The wall of upper chamber 50 preferably has a slight, diverging taper in the downward direction and ore 17 to be treated is admitted into the top of chamber 50 by way of hopper 23 and double bells 20, 21.

The intermediate chamber 52 is generally conical with the wall preferably converging (as measured in the downward direction) at an angle of not more than 15° from vertical to assure free flow of the ore along the wall and thus eliminate the possibility of forming stagnant ore. The upper end of intermediate chamber 52 is larger in diameter than the lower discharge end of upper chamber 50 at the junction between the two thus establishing an upper annular plenum space 53 into which the hot reactive gas mixture is delivered from conduit 57 leading from the vertically disposed mixing chamber 58.

At the discharge end of chamber 52 there is provided a conical shell 54 preferably made from a good heat resisting material such as "Inconel," a high nickel ferrous alloy, that will retain its shape and strength under the temperatures and loading conditions encountered in the furnace. The wall of insert 54, which forms a continuation of the brickwork wall portion 55 of chamber 52, extends for a considerable distance into the lower chamber 51 and since the lower discharge end of shell 54 is of smaller diameter than that of lower chamber 51, a second, intermediate, annular plenum space 56 is established at the upper end of chamber 51 for collecting and discharging reactive gas mixture preheated by the ore charge in chamber 51 into a gas diverting conduit 59 which leads to the lower entrance end of mixing chamber 58.

The discharge end of lower chamber 51 is fitted with a tapered metallic shell 60, converging in the downward direction which discharges into a larger convergingly tapered shell 63 to thereby establish a third, lower annular plenum space 64 into which relatively cool reactive gas mixture is delivered for flow upwardly through the downwardly descending ore column 17 in chamber 51.

The lower vertical discharge mouth 65 of shell 63 empties the ore onto a horizontal plate 66 supported directly beneath mouth 65 by the side walls of a discharge chamber 67, the plate 66 being provided with a plurality of apertures 68 through which ore drops into the lower end of shell 67 for final discharge through star gate 40. A rake 69 is arranged to reciprocate across the uper face of plate 66 by means of a motorized drive consisting of a variable speed motor 70 driving an eccentric plate 71 to which is coupled one end of crank 72, the other end of crank 72 being connected to the rake handle 73 which slides in bearing sleeve 74. Eccentric plate 71 is preferably provided with a plurality of apertures 71a at different radial distances from the center of rotation usable selectively to receive the coupling pin 72a of crank 72 so that the stroke of the rake can be correspondingly adjusted, and motor 70 is provided with a variable resistance 75 in its armature circuit so that the frequency with which rake 69 reciprocates can also be adjusted. These two controls for the rake are used to regulate the rate at which the ore column will be permitted to descend through the furnace structure, and the considerable height of the ore column below plenum space 64 in combination with the air tight shell 63 and chamber 67 set up a back pressure sufficient to prevent any appreciable loss of reactive gas mixture entering chamber 64 downwardly through the discharge gate 40.

In addition to introduction of reactive gas mixture into plenum space 64, such gas is also introduced directly into the body of ore in chamber 51 by means of a pipe 76 arranged vertically and centrally within chamber 51, a conical shield 77 being provided over the outlet end of the pipe to facilitate distribution of the gas and preventing clogging of the pipe by ore.

Exhaust gas discharges from the upper end of upper chamber 50 by way of exhaust conduit 25, stripped of solids in dust collector 26, transported through conduit 27 into cooler or scrubber 28 where its temperature is reduced and excess moisture is removed, and thence delivered through conduit 43 to the suction side of blower 1. A sufficient amount of the exhaust gas is bled through the bleed conduit 30 tapped from exhaust conduit 25 to maintain continuously uniform pressures throughout the closed circuit.

From the pressure side of blower 1, cool and clean exhaust gas is transported through conduit 2 and distributed by a Y joint to a branch conduit 78 leading to plenum chamber 64 and branch conduit 79 leading to the vertical pipe 76. Preferably, adjustable valves 80 are interposed in the conduits 78, 79 to adjust the division of the total gas in conduit 2 between branch conduits 78, 79.

Reducing gas (rich in CO), in sufficient quantity to replace that used in the reduction of the manganese and iron oxides and the small amount lost through the bleed line 30, to the end that the reactive gas mixture will always be of the same "richness" when entering the furnace, is admitted to conduit 2 through supply pipe 31 in which is located a valve 84 controlled by solenoid 85.

Provision is made for continuously analyzing the enriched carrier gas just prior to entering the furnace, and automatically regulating the flow of reducing gas into the gas system at this point in accordance with the gas analysis so that a substantially uniform degree of "richness" is maintained. For this purpose there preferably is used an industrial type of gas analyzer known to the trade as a Bailey meter. The construction of the meter is well known, and hence in the interest of simplifying the drawings has been illustrated simply by box 86. The CO-enriched reactive gas mixture is tapped from the circulating system just prior to entering the furnace by a T connection 87 and carried through conduit 88, which may include a shut-off cock 93, to the analyzer 86. The CO content of the reactive gas mixture can be recorded, or, as shown, registered on meter 91. For automatic control purposes, there is also produced a control voltage variable inversely with the departure of the CO content of the reactive gas mixture from the predetermined degree of richness desired to be maintained, and such voltage is applied over line 94 to the solenoid 85 controlling the degree of opening of the valve 84 in the CO gas supply line 31. Hence valve 84 will be moved to a more open position with increased energization of solenoid 85 as the CO content of the reactive gas mixture drops below the predetermined value desired to be maintained, and, conversely, valve 84 will move to a more closed position whenever the CO content rises above the predetermined value.

Provision is also made for continuously analyzing and indicating the CO content of the minor fraction of exhaust gas vented to waste through pipe 30. To this end there is provided a conduit 89 extending from T connection 90 in pipe 30 to the analyzer 86, and the CO content is read on meter 95. Conduit 89 may also include a shut-off cock 92.

For heating the reactive gas mixture where the larger portion of it leaves the lower chamber 51 (since plenum chamber 56 and conduit 59 offer a path far less resistant to gas flow than the ore column) there is provided a combustion chamber 100 disposed horizontally. Fuel and combustion air enter chamber 100 from the right end as viewed in the drawing, and the hot combustion gas leaves chamber 100 through a constricted outlet 101 that discharges into the lower end of mixing chamber 58 opposite the discharge end of conduit 59. The reactive gas mixture entering chamber 58 through conduit 59 thus mingles intimately with and is heated by the combustion gases discharged through the restricted outlet 101. The restriction 101 assures complete combustion within the combustion chamber proper and prevents the flame from being blown out by the gas sweeping into mixing chamber 58.

It is most desirable to maintain such a ratio between fuel and combustion air that just enough oxygen is introduced to convert all the combustibles of the fuel into $CO_2$ and $H_2O$ without causing any residual excess of free oxygen. To this end there have been shown gear actuated valves 102, 103 in the fuel and air conduits 104, 105, respectively, the gear 106 of valve 102 being meshed with the gear 107 of valve 103, and the two gears being so sized as to maintain the desired ratio of fuel to air flow into combustion chamber 100 throughout the range of fuel and air adjustment.

It is also preferable to maintain the thermally enhanced reactive gas mixture discharging through conduit 57 into plenum chamber 53 at a constant temperature. To this end, a temperature sensing device such as thermocouple 108 placed in conduit 57 is electrically connected by wires 109 to a control unit 110 of conventional design and which therefore has been illustrated only in "block" form. Control unit 110 translates departures in temperature in conduit 57 measured by thermocouple 108 from a predetermined temperature level into control voltages which feed over wires 111 to motor 112 and cause the shaft of the latter to rotate in one direction or the other dependent upon the sense of the departure in temperature of the gas in conduit 57 from the predetermined value desired to be maintained. The shaft of motor 112 drives gear 113 which meshes with gear 106, and hence valves 102, 103 controlling flow of fuel and air, respectively, will be regulated simultaneously and automatically to vary the fuel and air as may be necessary to maintain constant gas temperature in conduit 57.

The apparatus above described forms no part of the present invention.

In carrying out the process of the present invention in the apparatus described above, the particulate ore material is fed substantially continuously, by the double bell and hopper device, to the stockline of column 17, and roasted and cooled ore is discharged through discharge mouth 65 at such rate as to maintain substantially constant the height of the column in the furnace. Heated reactive gas mixture, from mixing chamber 58, is forced into plenum space 53 and thence into and upwardly through column 17, exiting from the top of the furnace through exhaust main 25 in the direction of dust collector 26. A certain proportion of exhaust gas is bled off, from main 25, through valved bleed-line 30 to atmosphere. The residual exhaust gas, after exiting from dust collector 26, is led by gas line 27 into a cooler-scrubber 28 wherein the gas is cooled and substantially dried. From 28, the residual exhaust gas passes by way of conduit 43 to the inlet (suction) side of motor-driven blower 1 and from thence through inlet conduit 2 and branch conduits 78, 79 into the furnace at points adjacent the bottom of the latter. Before said gas enters the furnace the same is "enriched" by adding thereto, by way of supply pipe 31, a gas rich in gaseous reducing agent (CO or/and $H_2$). The so-enriched gas, i. e., re-constituted reactive gas mixture, is forced through that part of the total column occupying lower chamber 51, and largely is diverted from the column into plenum space 56, and from thence by way of gas diverting conduit 59 to and into mixing chamber 58 wherein the same is thermally enriched by the addition of highly heated gaseous combustion products from combustion chamber 100.

*Example*

The starting material was a tailing from a sink-float operation previously practiced on a lean ore, said tailing analyzing 26.62% Fe, 7.56% Mn, 41.53% $SiO_2$ and about 6% moisture, the iron being present mostly as hematite and the manganese being present as pyrolusite, manganite and psilomelane. The screen analysis of the tailing material was as follows:

|  | Per cent |
|---|---|
| Plus ¾ inch | 2.64 |
| Plus ½ inch | 12.18 |
| Plus ⅜ inch | 22.58 |
| Plus 3 mesh | 20.91 |
| Plus 6 mesh | 29.25 |
| Plus 35 mesh | 9.83 |
| Plus 65 mesh | 0.40 |
| Plus 100 mesh | 0.28 |
| Minus 100 mesh | 1.93 |
|  | 100.00 |

This tailing material was in a form adapted for use in this process without further treatment.

The tailing material was fed, at room temperature (about 60° F.), to a reducing furnace of the type above described, said furnace having a diameter of 2.5 feet at the stockline, at a rate equivalent to a discharge rate of 1200 pounds of dry roasted product per hour. The mixing chamber temperature was maintained at 1000° F., for which purpose on the average of 0.42 gallon of fuel oil per hour was burned with 10 cubic feet per minute of combustion air in the combustion chamber and the resulting highly heated gaseous combustion product was mixed, in the mixing chamber, with the preheated reactive gas mixture which had been diverted to the latter from the top of the lower chamber of the furnace. The entrant gas, i. e., the reactive gas mixture, had a volume of 300 cubic feet per minute (C. F. M.) measured at 60 F., and analyzed: 6.5% CO, 16% $CO_2$, and 77.5% $N_2$. The exhaust gas exited from the top of the furnace at a temperature of approximately 325° F., while the roasted product was discharged from the bottom of the furnace at a temperature of about 250° F. About 80 C. F. M. of the exhaust gas, the same containing 2.7% CO, 27.2% $CO_2$ and 67% $N_2$, was vented to atmosphere. The residual gas was scrubbed and cooled to about 60° F., and to it was added about 65 C. F. M. of a producer gas analyzing:

|  | Per cent |
|---|---|
| CO | 33.0 |
| $H_2$ | 1.8 |
| $CO_2$ | 1.6 |
| $H_2O$ | 0.5 |
| $N_2$ | Balance | whereby to reconstitute the original reactive gas mixture.

While the temperature of the heated reactive gas mixture introduced into the column was maintained at not to exceed 1000° F., it was observed that at a level about 24 inches, more or less, below the stockline the material attained a peak temperature of about 1510° F.

In this operation substantially all of the oxidic iron content of the tailing material was converted to $Fe_3O_4$ and substantially all of the $MnO_2$ content thereof was converted to MnO. In an ensuing leaching operation the manganese recovery was 85% of theoretical. This 85% recovery efficiency from such low grade starting material represented a substantially complete reduction of the manganese to MnO—that is to say, a greater than 85% reduction of $MnO_2$ to MnO—because the efficiency of the leaching process per se was not 100%. Magnetic concentration tests of the leach residue established that 92% of the original Fe content was in the form of $Fe_3O_4$ and could be recovered from the residue as a magnetite concentrate.

The reducing gas utilization was 89.9%. That is to say, 89.9% of the reducing gas fed to the cyclical system was actually used in reducing $MnO_2$ to MnO and $Fe_2O_3$ to $Fe_3O_4$, and only 10.1% was wasted. Such high utilization of reducing gas is altogether unique among known processes of reducing manganese.

The thermal efficiency of the process was very great, the process using only 0.78 gallon of fuel oil per long ton of roasted product.

In the case of an ore containing a high amount of manganese the heat of reaction of $MnO_2$ to MnO—normally productive of a "high peak temperature"—may make it desirable, once the furnace and contained column of particulate ore material has been brought up to operating temperature as described in the above example, to omit the step of thermally enriching the preheated reactive gas mixture (i. e., to cease feeding combustible fuel and combustion air to the combustion chamber) and to circulate cool reactive gas mixture only as a means of sufficiently tempering the "peak temperature" to avoid producing a "dead-burned" MnO product. Thus, if found desirable, the preheated reactive gas mixture may be cooled (instead of being thermally enriched) in the upper chamber of the furnace by the use of conventional indirect gas cooling means therein. Or, reactive gas mixture, in excess of the amount required to cool the material in the lower chamber and in relatively cold state, may be introduced into the mixing chamber or into the upper part of the column to lower the temperature of the preheated gas.

It should be noted that the gaseous reducing agent may be carbon monoxide or hydrogen or a mixture of carbon monoxide and hydrogen.

I claim:

In the process of reductively roasting a manganiferous iron ore material containing at least 7.56% $MnO_2$, to convert the manganese content thereof to manganous oxide and the iron content thereof to magnetite, involving the steps of establishing and maintaining a gravitationally descending column of the initially substantially unheated ore in particulate form and countercurrently passing through at least the upper part of the column an initially heated reactive gas mixture containing carbon dioxide and a gaseous reducing agent of the group consisting of carbon monoxide and hydrogen, there being present more carbon dioxide than gaseous reducing agent, the mode of preventing "dead burning" of the manganese oxide content of the ore and of preventing formation of poorly leachable manganous oxide which consists in so controlling the volume and the initial temperature of the reactive gas mixture, within the range 800°–1000° F., as to prevent the occurrence in the top 24 inches of the ore column of a peak temperature materially above 1510° F.

References Cited in the file of this patent

UNITED STATES PATENTS

| Number | Name | Date |
|---|---|---|
| 1,401,222 | Wiberg | Dec. 7, 1921 |
| 1,591,470 | Constant et al. | July 6, 1926 |
| 1,901,102 | Holt et al. | Mar. 14, 1933 |
| 1,951,342 | Bradley | Mar. 20, 1934 |
| 2,048,112 | Gahl | July 21, 1936 |
| 2,074,013 | Bradley | Mar. 16, 1937 |
| 2,142,100 | Avery | Jan. 3, 1939 |
| 2,310,258 | Riveroll | Feb. 9, 1943 |
| 2,333,111 | Lykken | Nov. 2, 1943 |
| 2,528,553 | Royster | Nov. 7, 1950 |

FOREIGN PATENTS

| Number | Country | Date |
|---|---|---|
| 284,098 | Great Britain | Jan. 26, 1928 |